US007213752B2

(12) United States Patent
Huang

(10) Patent No.: US 7,213,752 B2
(45) Date of Patent: May 8, 2007

(54) METHOD OF PREVENTING TOC READING ERROR IN A MULTI-SESSION DISC

(75) Inventor: Chih-Wei Huang, Taipei (TW)

(73) Assignee: Lite-On It Corporation, Taipei (TW)

( * ) Notice: Subject to any disclaimer, the term of this patent is extended or adjusted under 35 U.S.C. 154(b) by 476 days.

(21) Appl. No.: 10/710,242

(22) Filed: Jun. 29, 2004

(65) Prior Publication Data

US 2005/0022070 A1 Jan. 27, 2005

(51) Int. Cl.
*G06K 15/00* (2006.01)
*G06K 7/10* (2006.01)

(52) U.S. Cl. .................. 235/383; 235/454; 369/30.12; 369/30.11

(58) Field of Classification Search ................ 235/383, 235/454, 455, 375; 369/30.12, 30.11, 53.2, 369/52, 275.1, 275.3, 275.4
See application file for complete search history.

(56) References Cited

U.S. PATENT DOCUMENTS 6,104,679 A * 8/2000 Sollish .................... 369/53.21
6,462,753 B1 * 10/2002 Koyata et al. .............. 715/716
2002/0012315 A1 * 1/2002 Iida et al. ................ 369/275.1
2004/0001397 A1 * 1/2004 Jeong et al. ............. 369/30.11
2005/0022070 A1 * 1/2005 Huang ......................... 714/47
2005/0152242 A1 * 7/2005 Shishido ................. 369/47.22

* cited by examiner

*Primary Examiner*—Thien Minh Le
(74) *Attorney, Agent, or Firm*—Winston Hsu

(57) ABSTRACT

A method for preventing a TOC reading error in a multi-session disc includes determining a range of absolute time of a specific session, when a plurality of Q codes, each of which has a value in a "POINT" item not equal to B0, are read, determining whether each of the plurality of Q codes is located in the range of absolute time according to an absolute time of each Q code, and when a first Q code having a value in the "POINT" item equal to B0 is read, reading a second Q code that has a value in the "POINT" item not equal to B0 again, and determining whether the absolute time of the second Q code is within the range of absolute time.

12 Claims, 4 Drawing Sheets

| S0 S1 | Control | ADR | TN0 | POINT | MIN | SEC | FRAME | Zero | PMIN | PSEC | PFRAME | CRC |
|---|---|---|---|---|---|---|---|---|---|---|---|---|

Fig. 2 Prior Art

METHOD OF PREVENTING TOC READING ERROR IN A MULTI-SESSION DISC

BACKGROUND OF INVENTION

1. Field of the Invention

The present invention relates to a method for reading a table of contents, and more particularly, to a method for preventing a reading error of a table of contents in a multi-session disc.

2. Description of the Prior Art

When an optical disk drive starts up, it has to read the table of contents (TOC) in the lead-in areas on the disc and save the TOC in the memory of the optical disk drive. In this way, the optical disc drive is capable of obtaining the locations of tracks on the disc according to the information stored in the memory. The information stored in the memory can be an index for the optical disk drive to read data on the disc.

Please refer to FIG. 1. FIG. 1 is a diagram of a multi-session disk 100. Each session 20, 30 or 40 comprises a lead in area, a program area, and a lead out area. For example, session 20 comprises its lead in area 22, program area 24, and lead out area 26; session 30 comprises its lead in area 32, program area 34, and lead out area 36; and session 40 comprises its lead in area 42, program area 44, and lead out area 46. Each of the program areas 24, 34 and 44 may be divided into a plurality of tracks for storing data. The TOCs are stored in the lead-in areas 22, 32 and 42 recording the information of all tracks in the sessions 20, 30 and 40. When the optical disk drive starts up, it is able to read data on specific tracks after the TOCs stored in the lead-in areas 22, 32 and 42 have been read sequentially. Generally, the length of the lead-in area of each session is 1 minute, the length of the lead-out area of the first session is 1 minute and 30 seconds, and the length of the lead-out area of each session other than the first session is 30 seconds.

The TOCs are stored in Q channels of lead-in areas. Please refer to FIG. 2. FIG. 2 is a constituent of a Q code representing specific track information or a special information. There are many sets of Q codes repeatedly appear in a lead in area and each set of Q codes represents the whole information of the session. There is no needed for the optical disc drive to read all sets of Q codes. It is enough to obtain the whole information of the session if the optical disc drive is capable of capturing one set of Q codes. The following statement describes some items of a Q code.

The value in a "POINT" item is within the range from 01 to 99 in most of the cases. For example, if the value in the "POINT" item of a Q code is N, it is the data of the Nth track stored in this Q code. The values in the "MIN" item, the "SEC" item, and the "FRAME" item together present the absolute time of the location of the Q code. And the values in the "PMIN" item, the "PSEC" item, and the"PFRAME" item together present the starting location of the Nth track.

However, when the value in the "POINT" item is beyond the range from 01 to 99, the meanings represented by the values in other items are then changed. For instance, if the value in the "POINT" item of one Q code is A0, the values in the "MIN" item, the "SEC" item, and the "FRAME" item still represent the absolute time of the location of the Q code, but the value in the "PMIN" item represents the track number of the first track in this session. If the value in the "POINT" item is A1, the values in the "MIN" item, the "SEC" item, and the "FRAME" item still represent the absolute time of the location of the Q code, but the value in the "PMIN" item represents the track number of the last track in this session. If the value in the "POINT" item is B0, the values in the "MIN" item, the "SEC" item, and the "FRAME" item together represent the starting location of the program area of the next session. Notice that when the value in the "POINT" item is B0, we are not able to know the absolute time of the location of present Q code. Since the values in the "MIN" item, the "SEC" item, and the "FRAME" item represent the starting location of the program area of the next session, the location of the lead-in area of the next session is obtained by subtracting 1 from the value recorded in the "MIN" item simply.

When loading a multi-session disk, the optical disk drive has to read the information of all tracks stored in the TOCs in all sessions sequentially. The optical disk drive needs to obtain the Q code having a "POINT" item of B0, and then drive the optical read/write head to move to the lead-in area of the next session according to the values in the "MIN" item, the "SEC" item and the "FRAME" item of the Q code. When the TOCs in all sessions are all saved into the memory, the process of starting up is then finished completely.

Please refer to FIG. 3. FIG. 3 is a flowchart of a prior art optical disk drive reading the TOCs.

Step 310: Read the two Q codes of which the values in the "POINT" item are A0 and A1, and determine the total amount of tracks and the track numbers in the session according to the value in the "PMIN" item of the two Q codes;

Step 320: Read Q codes of all track numbers;

Step 330: If the Q code of which the values in the "POINT" item is B0 can be read, go to Step 340; if not, go to Step 350;

Step 340: Drive the optical read/write head to move to the lead-in area of the next session according to the values in the "MIN" item, the "SEC" item, and the "FRAME" item of the Q code of which the value in the "POINT" item is B0; go to step 310;

Step 350: End.

When the optical read/write head reads the TOC in the lead-in area in a specific session, the Q codes having "POINT" items of A0 and A1 have to be read first, and the amount of tracks and track numbers in this session are obtained accordingly. For example, if the values in the "PMIN" item of the Q codes having "POINT" items of A0 and A1 are 05 and 08, the amount of tracks are 4 in this session and the track numbers are 5, 6, 7 and 8 sequentially. In consequence, the optical disk drive is capable of recording the values in the "PMIN" item, the "PSEC" item and the "PFRAME" item of the Q codes of which the values in the "POINT" item are 05, 06, 07 and 08 respectively.

Then the optical disk drive attempts to read the Q code having a "POINT" item of B0. If the Q code can be read, the optical disk drive drives the optical read/write head to jump to the lead-in session of the next session according to the values in the "MIN" item, the "SEC" item and the "FRAME" item, and continues reading the TOC in the session. If the Q code cannot be read, it means the session is the last session, and the process of starting up the optical disk drive can be finished accordingly.

However, in the prior art, the absolute time of the location of the Q code having a "POINT" item of B0 is not indicated. Hence when the optical disk drive reads the Q code having a "POINT" item of B0, it is not able to determine whether this Q code is located at the lead-in area of the same session as the Q code that was received before. That means that when the optical disk drive reads the Q code in the TOC of the lead-in area of the first session, it is possible that the optical read/write head jumps to the lead-in area of the second session due to some external force. Therefore, in the second session, the optical read/write head may read the Q code having a "POINT" item of B0. If the optical disk drive drives the optical read/write head to jump to the lead-in area of the next session and reads the TOC according to the values in the "MIN" item, "SEC" item and "FRAME" item, it is unable to save all information of all tracks in its memory, and hence the process of starting up fails.

SUMMARY OF INVENTION

It is therefore a primary objective of the claimed invention to provide a method for preventing a TOC reading error in a multi-session disc that can determine whether the read Q code is within a determined range of absolute time of a specific session.

Briefly described, the claimed invention discloses a first method for preventing a TOC reading error in a multi-session disc. The method includes determining a range of absolute time of a specific session when a plurality of Q codes, each of which has a value in a "POINT" item not equal to B0, are read, determining whether each of the plurality of Q codes is located in the range of absolute time according to an absolute time of each Q code, when a first Q code having a value in the "POINT" item equal to B0 is read reading a second Q code that has a value in the "POINT" item not equal to B0 again, and determining whether the absolute time of the second Q code is within the range of absolute time.

The claimed invention further discloses a second method for preventing a reading error of a table of contents in multi-session disc. The method includes determining a range of absolute time of a specific session, and when a plurality of Q codes, each of which having a value in a "POINT" item not equal to B0, are read, determining whether each of the plurality of Q codes is located in the range of absolute time according to an absolute time of each Q code.

The claimed invention further discloses a third method for preventing a reading error of a table of contents in multi-session disc. The method includes determining a range of absolute time of a specific session, and when a first Q code having a value in a "POINT" item equal to B0 is read, reading a second Q code that has a value in a "POINT" item not equal to B0 again, and determining whether the absolute time of the second Q code is within the range of absolute time.

It is an advantage of the claimed invention that the method is capable of determining a range of absolute time of a specific session first. In the claimed invention, whether the read Q code is located in the expected session can be determined.

These and other objectives of the claimed invention will no doubt become obvious to those of ordinary skill in the art after reading the following detailed description of the preferred embodiment that is illustrated in the various figures and drawings.

BRIEF DESCRIPTION OF DRAWINGS

FIG. 2 is a constituent of a Q code.

DETAILED DESCRIPTION

Figure 1:
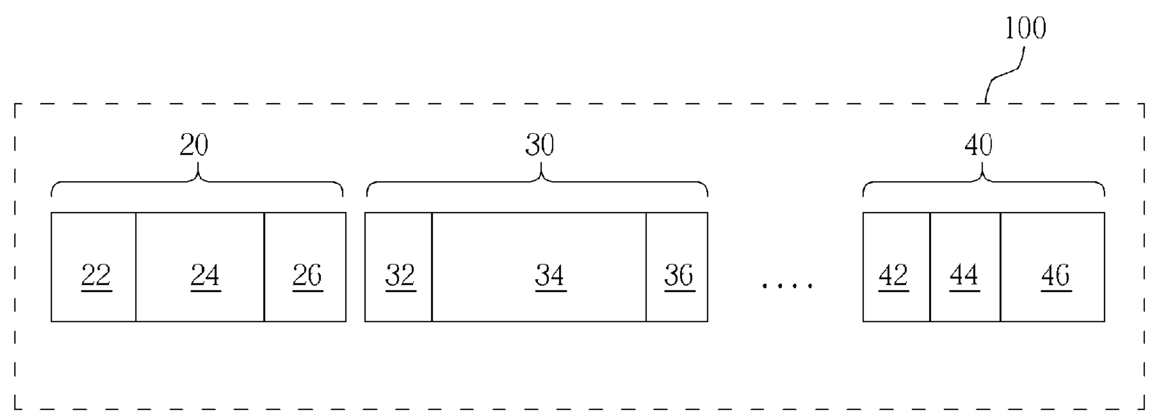
FIG. 1 is a diagram of a multi-session disk according to the prior art.
Figure 3:
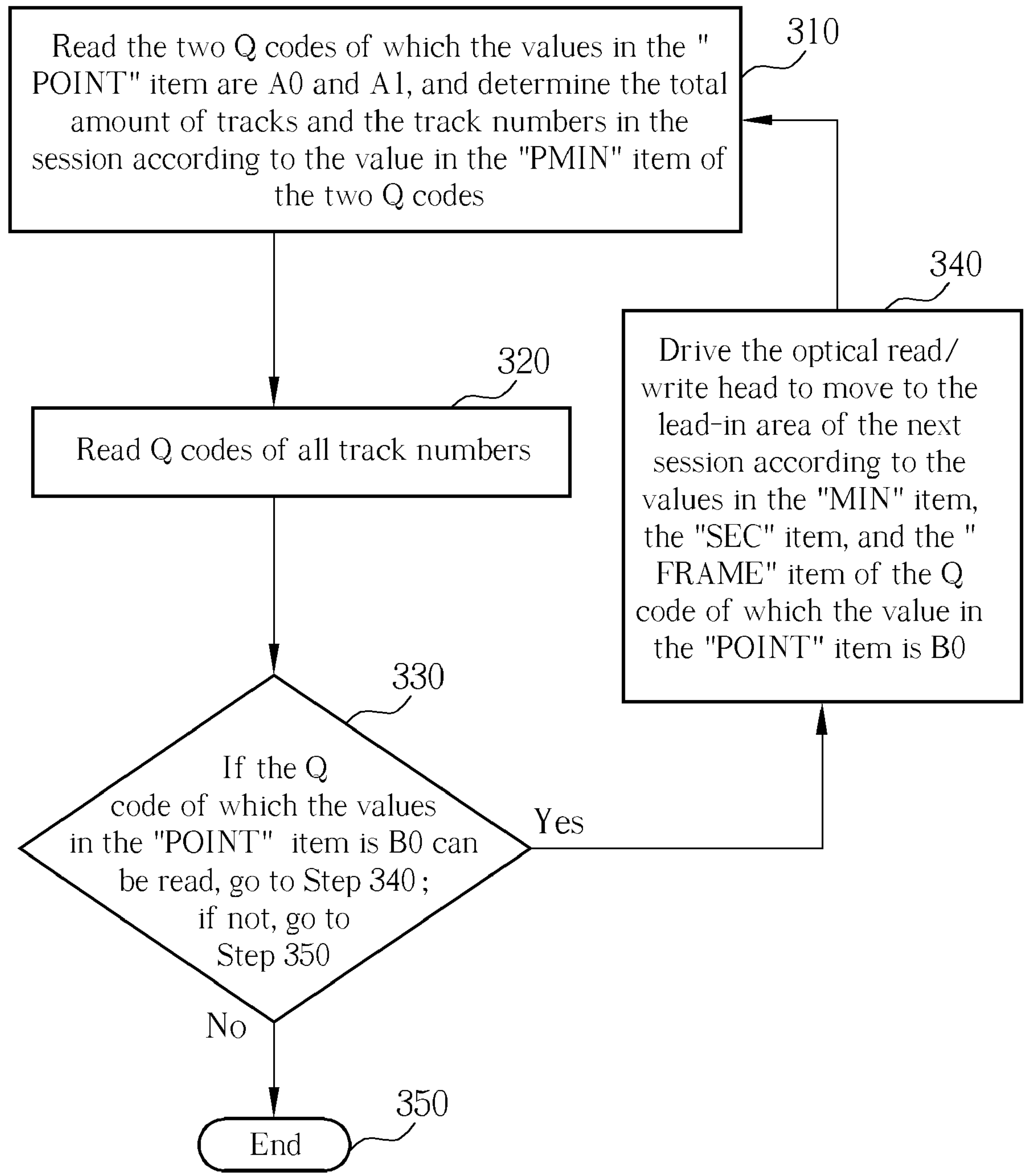
FIG. 3 is a flowchart of a prior art optical disk drive reading a TOC.
Figure 4:
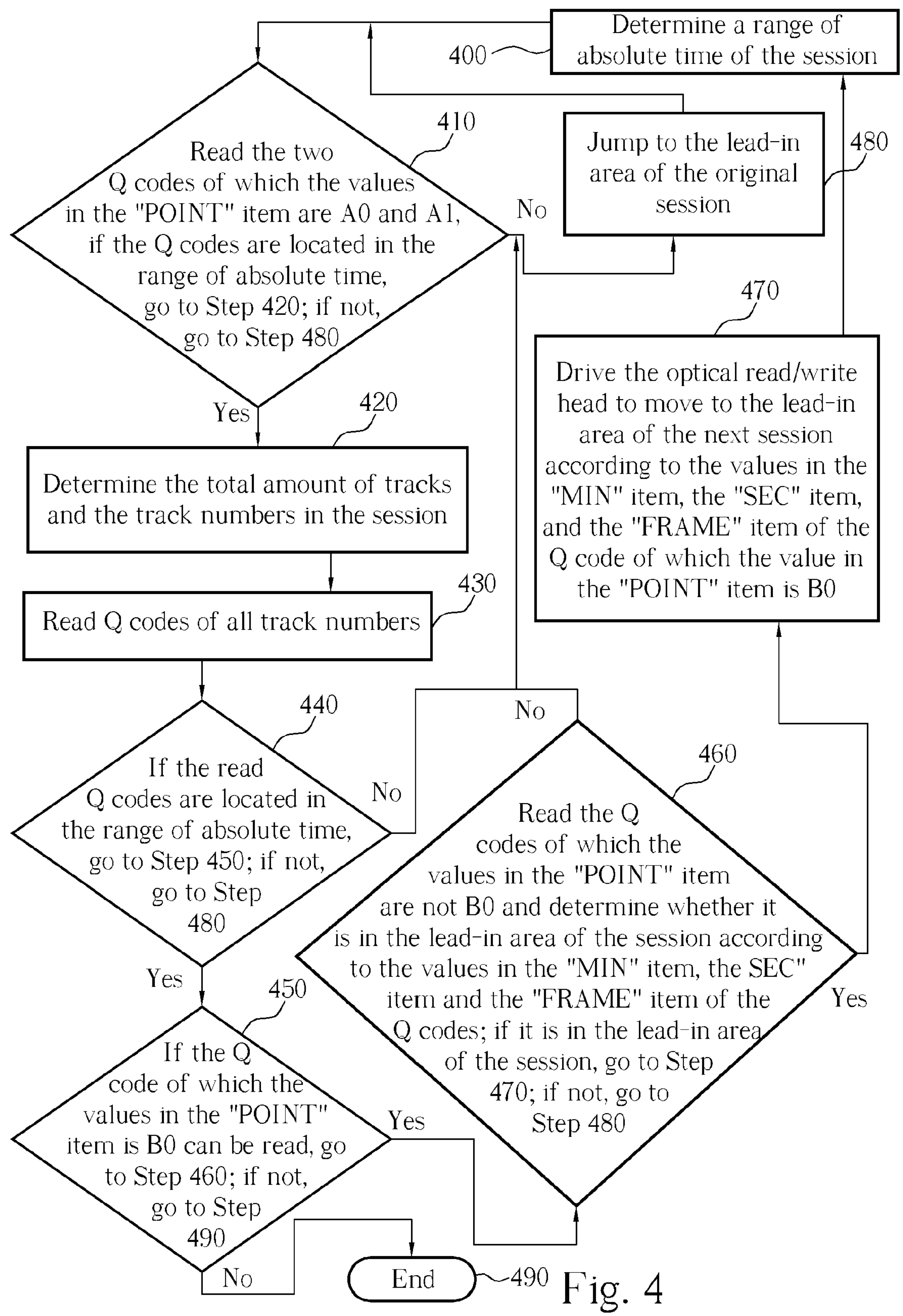
FIG. 4 is a flowchart of the present invention optical disk drive reading a TOC.

Please refer to FIG. 4. FIG. 4 is a flowchart of the present invention optical disk drive reading a TOC.

Step 400: Determine a range of absolute time of the session;

Step 410: Read the two Q codes having "POINT" items of A0 and A1, if the Q codes are located in the range of absolute time, go to Step 420; if not, go to Step 480;

Step 420: Determine the total amount of tracks and the track numbers in the session;

Step 430: Read Q codes of all track numbers;

Step 440: If the read Q codes are located in the range of absolute time, go to Step 450; if not, go to Step 480;

Step 450: If the Q code having a "POINT" item of B0 can be read, go to Step 460; if not, go to Step 490;

Step 460: Read one Q code of which the values in the "POINT" item are not B0 and determine whether this Q code is still in the lead-in area of the session according to the values in the "MIN" item, the "SEC" item and the "FRAME" item of the Q codes; if it is in the lead-in area of the session, go to Step 470; if not, go to Step 480;

Step 470: Drive the optical read/write head to move to the lead-in area of the next session according to the values in the "MIN" item, the "SEC" item, and the "FRAME" item of the Q code having the "POINT" item of B0;

Step 480: Jump to the lead-in area of the original session;

Step 490: End.

The starting location of the lead-in area is known because the starting location (the absolute time of the starting location) of the program area of the present session is known: the absolute time of the starting location of the lead-in area is 1 min before the absolute time of the starting location of the program area, and the range of absolute time of the lead-in area is between the starting location of the lead-in area and the starting location of the program area. Since the range of absolute time is ensured, when reading a Q code having a "POINT" item of not B0, the location of the Q code can be determined whether it is within the range of absolute time according the values in the "MIN" item, the "SEC" item and the "FRAME" item. If the location of the Q code is within the range of absolute time, the optical read/write head is reading the data in the lead-in area of the original session. Otherwise, the optical read/write head needs to be moved back to the original session and the TOC in the lead-in area needs to be read again. Furthermore, when a Q code having a "POINT" item of B0 is read, the optical read/write head reads another Q code with a "POINT" item not B0, and determines whether the absolute time of this Q code recorded in the "PMIN" item, the "PSEC" item and the "PFRAME" item is still within the range of absolute time of the present session. If the absolute time of this Q code is in the range of absolute time of the present session, the Q code with the "POINT" item B0 is within the present session, then the step 470 should be performed. If the absolute time of this Q code is beyond the range of absolute time of the present session, the Q code with the "POINT" item B0 is not in the present session and the optical read/write head should be driven to jump back to the lead-in area of the original session and the TOC should be read again.

Compared to the prior art, the present invention prevents the TOC reading error by determining whether the absolute time of a Q code is within a range of absolute time of a specific session. When a Q code with a "POINT" item not B0 is read, the present invention determines whether the absolute time of the Q code is within the range of absolute time of a specific session to determine whether the Q code is located in the lead-in area of the original session immediately. When a Q code having a "POINT" item of B0 is read, the present invention reads another Q code to determine whether it is still within the lead-in area of the original session. Therefore, the problem in the prior art of not knowing whether the location of the Q code with a "POINT" item of B0 is within the lead-in area of the same session is solved.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method for preventing a reading error of a table of contents (TOC) in a multi-session disc, the method comprising:

determining a range of absolute time of a specific session;

when a plurality of Q codes, each of which has a value in a "POINT" item not equal to B0, are read, determining whether each of the plurality of Q codes is located in the range of absolute time according to an absolute time of each Q code; and when a first Q code having a value in the "POINT" item equal to B0 is read, reading a second Q code that has a value in the "POINT" item not equal to B0 again, and determining whether the absolute time of the second Q code is within the range of absolute time.

2. The method of claim 1 wherein when the absolute time of the second Q code is not within the range of absolute time, driving an optical read/write head back to the specific session.

3. The method of claim 1 wherein when the absolute time of the second Q code is within the range of absolute time, jumping to a lead-in region of a session following the specific session according to values in a "MIN" item, a "SEC" item and a "FRAME" item of the first Q code.

4. The method of claim 1 wherein the range of absolute time of the specific session is determined according to a fourth Q code having a value in the "POINT" item equal to B0 and being within a session preceding the specific session.

5. The method of claim 1 wherein when the absolute times of the plurality of Q codes are not within the range of absolute time, driving an optical read/write head back to the specific session.

6. A method for preventing a reading error of a table of contents in multi-session disc, the method comprising:

determining a range of absolute time of a specific session; and when a plurality of Q codes, each of which has a value in a "POINT" item not equal to B0, are read, determining whether each of the plurality of Q codes is located in the range of absolute time according to an absolute time of each Q code.

7. The method of claim 6 wherein when the absolute times of the plurality of Q codes are not within the range of absolute time, driving an optical read/write head back to the specific session.

8. The method of claim 6 wherein the range of absolute time of the specific session is determined according to a fourth Q code having a value in the "POINT" item equal to B0 and being within a session preceding the specific session.

9. A method for preventing a reading error of a table of contents in multi-session disc, the method comprising:

determining a range of absolute time of a specific session; and when a first Q code having a value in a "POINT" item equal to B0 is read, reading a second Q code that has a value in a "POINT" item not equal to B0, and determining whether the absolute time of the second Q code is within the range of absolute time.

10. The method of claim 9 wherein when the absolute time of the second Q code is not within the range of absolute time, driving an optical read/write head back to the specific session.

11. The method of claim 9 wherein when the absolute time of the second Q code is within the range of absolute time, jumping to a lead-in region of a session following the specific session according to values in a "MIN" item, a "SEC" item and a "FRAME" item of the first Q code.

12. The method of claim 9 wherein the range of absolute time of the specific session is determined according to a fourth Q code having a value in a "POINT" item equal to B0 and being within a session preceding the specific session.

* * * * *